United States Patent
Inoue et al.

(10) Patent No.: US 6,837,921 B2
(45) Date of Patent: Jan. 4, 2005

(54) INK TANK

(75) Inventors: Hiroyuki Inoue, Kanagawa (JP); Masahito Yoshida, Saitama (JP); Takashi Nojima, Tokyo (JP); Shusuke Inamura, Tokyo (JP); Yasufumi Tanaami, Tokyo (JP); Takeshi Iwasaki, Kanagawa (JP); Noriko Sato, Tokyo (JP); Yasuyuki Hirai, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 139 days.

(21) Appl. No.: 10/382,495

(22) Filed: Mar. 7, 2003

(65) Prior Publication Data

US 2003/0173278 A1 Sep. 18, 2003

(30) Foreign Application Priority Data

Mar. 12, 2002 (JP) ........................................ 2002/066951
Mar. 12, 2002 (JP) ........................................ 2002/066952

(51) Int. Cl.[7] ............................. B01D 19/00; B41J 2/175
(52) U.S. Cl. ............................ 96/6; 96/155; 55/385.6; 347/85
(58) Field of Search .................... 96/6, 155; 95/46; 55/385.4, 385.6; 210/188; 347/85, 86, 92, 93; 222/328

(56) References Cited

U.S. PATENT DOCUMENTS

| 4,940,995 | A | * | 7/1990 | Hine et al. ..................... 347/89 |
| 5,805,188 | A | * | 9/1998 | Nakajima et al. ............. 347/87 |
| 6,723,147 | B2 | * | 4/2004 | Mashiko et al. ........... 55/385.1 |
| 2001/0045976 | A1 | * | 11/2001 | Ara et al. ..................... 347/85 |
| 2003/0128257 | A1 | * | 7/2003 | Qingguo et al. .............. 347/85 |

FOREIGN PATENT DOCUMENTS

JP 03-073355 A * 3/1991

* cited by examiner

Primary Examiner—Frank M. Lawrence
(74) Attorney, Agent, or Firm—Fitzpatrick, Cella, Harper & Scinto

(57) ABSTRACT

An ink tank is formed having a generally rectangular parallelepiped shape, and air/fluid separating members having air pores are provided around at least the corner portions of the generally rectangular parallelepiped. The inner faces of wall members forming the outer faces of the generally rectangular parallelepiped are formed with an inclination of a predetermined angle as to the outer face of the wall member which it faces.

12 Claims, 11 Drawing Sheets

STEPPED PORTION

NOZZLE

INK TANK

BACKGROUND OF THE INVENTION

1. Field of the Invention

The present invention relates to an ink tank for supplying ink to an ink-jet recording apparatus.

2. Description of the Related Art

Ink-jet recording apparatuses which form images by discharging ink onto a recording medium require an ink tank for storing the ink to be discharged. Various conventional arrangements have been proposed for ink tanks. One example, disclosed in Japanese Patent Laid-Open No. 5-8404, is a proposal for an ink tank wherein ventilation holes are formed at each corner of the ink tank so as to communicate with the atmosphere and wherein at least the inner face of the ventilation holes is formed of a water-repellant material, so that regardless of the attitude for fixing the ink tank, one of the ventilation holes is always situated above the ink level such that the inside of the ink tank communicates with the atmosphere, with the ink being supported by the surface tension of the ink at the ventilation holes lower than the ink level, thereby preventing ink from leaking out from the ventilation holes even in the event that the air in the ink tank expands due to a rise in ambient temperature. Such an ink tank design allows ink to be filled to the fullest capacity of a non-deforming hard case instead of a conventionally-proposed ink tank using a flexible pouch, and the ink storage capacity efficiency is high since all of the stored ink can be used up by introducing external air while using. This realizes a large-capacity ink tank which uses little space.

There are a great many such proposals, such as Japanese Patent Laid-Open No. 5-162325, Japanese Patent Laid-Open No. 8-118676, Japanese Patent Laid-Open No. 8-192519, Japanese Patent Laid-Open No. 9-141891, and so forth.

All of the ink tanks in the aforementioned proposals use an air/fluid separating member having air pores with water repellence. This member is formed of a film material of stretched PTFE (poly tetra fluoro ethylene), which has small pores and suitable water repellence. Accordingly, even in the event that fluid comes into contact with the air pores on the surface thereof, the fluid does not pass through the film due to its own surface tension, while gases pass through the film.

Now, it is a prerequisite of the conventional art that the air/fluid separating member and the air within the ink tank be in contact at some portion with the atmosphere at all times, regardless of the attitude of the ink tank. However, none of the aforementioned proposals can be the to truly disclose specific methods for satisfying such conditions. For example, in the event that there is a little air within the ink tank, the air is trapped at the upper portion of the ink tank, and in the event that the inner face of the ceiling of the ink tank is horizontal, the body of air may become stationary at an arbitrary position on the inner face of the ceiling of the ink tank. In the event that the ink is in contact with the entire surface of the air/fluid separating members provided at the corners of the ink tank, and in the event that the ambient temperature rises and the air which is stationary at the arbitrary position on the inner face of the ceiling of the ink tank expands, which raises the internal pressure of the ink tank, and this pressure exceeds the withstanding force of the air/fluid separating members, ink will permeate the air/fluid separating members and further leak out from the ink tank. Under such conditions, not only does the air/fluid separating member not function normally, but also invites ink leakage.

Of course, with an arrangement wherein the air/fluid separating member is provided on all wall faces, air would come into contact with the air/fluid separating member regardless of the stage, and the functions thereof would be fulfilled. However, the air/fluid separating member is relatively costly, so the area of air/fluid separating member used is preferably as small as possible, in order to reduce manufacturing costs of the ink tank.

Also, there are various types of ink stored in the ink tank, with components which inhibit the water-repellent capabilities of the air/fluid separating member in order to achieve a wide range of objects, such as improving the permeability of the ink on the recording medium upon which images are formed. For example, in the event that a surface-active agent is contained in the ink, the ink more readily adheres to the air/fluid separating member as compared with arrangements otherwise. Particularly, in the event that the air/fluid separating member is provided to the ceiling portion of the ink tank, there have been cases wherein ink remains adhered to the entire surface of the air/fluid separating member. In this case as well, the surface of the air/fluid separating member is closed off by the ink, so the air/fluid separating member can no longer transmit gas and accordingly looses its function.

SUMMARY OF THE INVENTION

Accordingly, it is an object of the present invention to provide an ink tank wherein air within the ink tank can be brought into contact with the air/fluid separating member is a sure manner.

In order to achieve the above objects, the ink tank according to the present invention is an ink tank for storing ink to be supplied to an ink-jet recording apparatus, the ink tank comprising: an ink tank body, formed in a generally rectangular parallelepiped shape; and air/fluid separating members having air pores, disposed in at least the proximity of each corner of the generally rectangular parallelepiped; wherein the inner face of each wall member forming each external face of the generally rectangular parallelepiped is formed so as to be inclined at a predetermined angle as to the outer face of another wall member facing the inner face.

With the ink tank according to the present invention as described above, the inner face of the wall member on the upper side of the ink tank is in an inclined state as to the horizontal direction, regardless which of the faces of the generally rectangular parallelepiped shape of the ink tank itself are placed downward, not to mention cases wherein the ink-jet recording apparatus to which the ink tank is mounted is placed in a normal setting position. Accordingly, any air within the ink tank, however little, will move diagonally upwards following the inner face of the wall member due to its own buoyancy, and reach one of the corner portions of the ink tank wherein the air/fluid separating members are disposed. Thus, the air comes into contact with the air/fluid separating member, so the problem in introducing air into the ink tank due to the air/fluid separating member being covered with ink does not occur, and further, air expansion due to temperature change or pressure change or the like leading to ink passing through the air/fluid separating member and leaking out can be prevented.

The predetermined angle is preferably within the range of 1° to 5°. This angle range for the inclination of the inner face of the wall members is sufficient to allow air to move along the inner face, while keeping loss of ink tank capacity due to the inclination angle on the inner face of the wall member to a minimum.

An attaching face for attaching the air/fluid separating members is preferably provided on the outer side of the ink tank. Configurations wherein the attaching face is attached on the inner side of the ink tank requires a face for attaching the air/fluid separating members on the inner side of the ink tank, and since an attaching face must be provided on the tip of the wall material of the ink tank, this forms a stepped portion with no air passage at that portion. On the other hand, with a configuration wherein the attaching face is provided on the outer side of the ink tank as with the present invention, there is no stepped portion formed at which there is no passage of air formed at the tip of the wall member of the ink tank, so air which moves to the corner portion following the upper face within the ink tank can be brought into contact with the air/fluid separating member in a sure manner. Also, the air/fluid separating members can be attached to the ink tank from the outer side thereof, so the manufacturing processes of he ink tank can be simplified.

Further, the air/fluid separating members may be attached in the proximity of the corner portions at any angle other than an angle wherein the plane portion of the air/fluid separating member would be parallel or orthogonal to at least two faces of the generally rectangular parallelepiped meeting one another. With this configuration, the plane portion of the air/fluid separating member is at an angle with the horizontal direction, regardless which of the faces of the generally rectangular parallelepiped shaped ink tank itself are placed downward, not to mention cases wherein the ink-jet recording apparatus to which the ink tank is mounted is placed in a normal setting position. Accordingly, even in cases wherein the water-repellent capabilities of the air/fluid separating member are not sufficient due to the components of the ink, ink adhering to the air/fluid separating member flows downwards by gravity following the inclined face formed by the inclined plane portion of the air/fluid separating member, so no ink remains on the surface of the air/fluid separating member, and the functions of the air/fluid separating member are not inhibited.

Further, chamfered portions may be formed at each corner portion of the generally rectangular parallelepiped, with the air/fluid separating members being attached to the chamfered portions. Or, chamfered portions may be formed on the four edge lines connecting the four corners of two faces of the generally rectangular parallelepiped which face one another, with the air/fluid separating members being attached to the chamfered portions.

Also, the ink tank may further comprise covers for covering each of the air/fluid separating members, with an atmosphere communicating hole having a cross-sectional area smaller than the effective functioning area of the air/fluid separating members being formed in the covers. According to such a configuration, the relatively fragile air/fluid separating members can be protected, and evaporation of ink from the air/fluid separating members only occurs from the small atmosphere communicating holes in the covers, so evaporation of ink from the ink tank can be kept at an extremely low level.

Further, with conventional ink tanks, ink extracting openings for extracting ink from the ink tank are often provided on the lower face of the ink tank. This is to extract the ink from the lower side of the ink tank, since the ink is stored at the lower side in the ink tank by gravity. However, with ink-jet recording apparatuses which can be set up two or more ways with regard to the attitude thereof, i.e., ink-jet recording apparatuses which can be mounted horizontally or vertically, this means that the setting attitude can be changed by 90°, and changing the setting attitude by 90° means that the lower face of the ink tank now faces sideways and that the ink extracting opening is on the side of the ink tank instead of on the lower face thereof. In the event that the ink within the ink tank is simply liquid ink, any ink below the ink extracting opening cannot be extracted from the ink tank, so there have been cases wherein changing the attitude for setting up the recording apparatus main unit increases the amount of leftover ink. To deal with this, this type of ink-jet recording apparatus has been provided with an absorbent material such as sponge or the like within the ink tank which absorbs and holds ink, so that ink lower than the ink extracting opening can be guided to the ink extracting opening by capillary action. However, ink tanks which use such absorbent members have a low capacity efficiency with regard to the amount of ink stored therein, and it has been difficult to store large amounts of ink in such arrangements.

Accordingly, in order to provide an ink tank which leaves little ink in the emptied ink tank so that ink can be used up with no waste, in addition to the advantages of enabling air inside the ink tank to come in contact with the air/fluid separating members in a sure manner, the ink tank may further have the ink extracting opening thereof near the longitudinally bottommost portion of the lower face of the ink tank which faces downwards in the state of the ink tank being attached to the ink-jet recording apparatus, with the inner face of the wall member forming the lower face of the generally rectangular parallelepiped being formed so as to be inclined as to the lower face at a predetermined angle such that the inner face slopes down toward the side to which the ink extracting opening is provided, in the state that the ink tank is attached to the ink-jet recording apparatus.

Further, the inner face of the wall member of the generally rectangular parallelepiped forming the outer face adjacent to the side of the lower face at which the ink extracting opening is provided may be formed having an inclination of a predetermined angle as to the outer face, so that the inner face slopes down toward the ink extracting opening, in the state that the outer face is faced downwards. Accordingly, even in the event that the ink tank is placed in a standing position, and there is little remaining ink therein, the little remaining ink can pooled at the side where the ink extracting opening is provided, so the ink can be used up with no waste.

Further, the predetermined angle is preferably within the range of 1° to 5°. This angle range for the inclination of the inner face of the wall members is sufficient to pool the little remaining ink at the side where the ink extracting opening is provided, while keeping loss of ink tank capacity due to the inclination angle of the inner face of the wall member to a minimum.

Also, the ink extracting opening may be configured such that an ink needle for extracting ink out from the ink tank perpendicularly penetrates the lower face, with the generally rectangular parallelepiped having the length in the longitudinal direction of the outer face adjacent to the side of the lower face wherein the ink extracting opening is provided formed so as to be shorter than the longitudinal length of the lower face.

In the event that an ink tank thus configured is placed with the outer face adjacent to the lower face facing downwards, the lower face is situated sideways, and the ink needle inserted through the ink extracting opening provided on the lower face becomes horizontal. Accordingly, ink pooled below the ink needle cannot be extracted. However, the longitudinal direction of the outer face adjacent to the side wherein the ink extracting opening on the lower face is provided is formed so as to be shorter than the longitudinal length of the lower face, so the amount of ink pooling below the ink needle can be reduced, thereby reducing the amount of residual ink.

Further objects, features and advantages of the present invention will become apparent from the following description of the preferred embodiments with reference to the attached drawings.

DESCRIPTION OF THE PREFERRED EMBODIMENTS

Next, embodiments of the present invention will be described with reference to the drawings.

Figure 1:
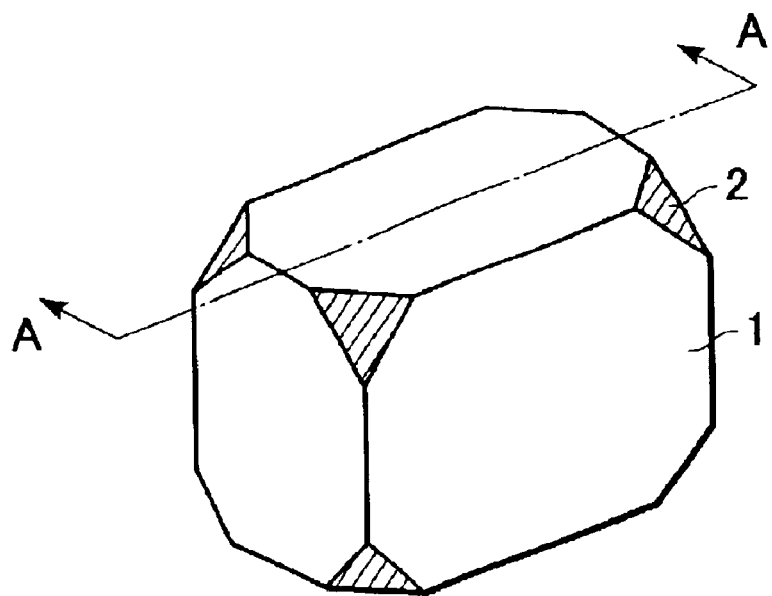
FIG. 1 is a perspective view illustrating one embodiment of the ink tank according to the present invention.
Figure 2:
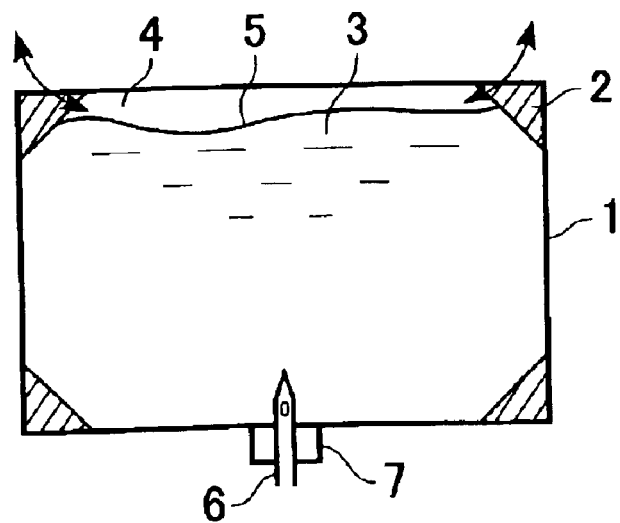
FIG. 2 is a schematic cross-sectional diagram of the ink tank along line A—A in FIG. 1.

FIG. 1 is a perspective view illustrating one embodiment of the ink tank according to the present invention, and FIG. 2 is a schematic cross-sectional view of the ink tank shown in FIG. 1 along line A—A.

The ink tank 1 is shaped as a rectangular parallelepiped, with chamfering at the eight corner portions thereof, and air/fluid separating members 2 provided to each of the chamfered portions. The air/fluid separating members 2 have air pores having water-repellent nature, and are formed of a film material of stretched PTFE (poly tetra fluoro ethylene), for example. Accordingly, even in the event that fluid such as ink comes into contact with the air pores on the surface thereof, the fluid does not pass through the film due to its own surface tension, while gases pass through the film. Also, as shown in FIG. 2, a spout 7 formed of a material such as rubber or the like is attached to the lower face of the ink tank 1 by application of pressure or bi-color forming, so as to maintain a sealed state as to the ink tank 1.

In the event of extracting the ink from the ink tank 1, an ink needle 6 which has a tip with a relatively sharp form is thrust into the spout 7, so that the tip thereof inters into the ink tank 1. The ink needle 6 is hollow, with a hole provided at the tip thereof. Accordingly, the ink within the ink tank 1 passes from this hole through an unshown ink channel inside the hollow ink needle 6, and is supplied to the ink-jet recording apparatus not shown in the drawings.

Figure 3:
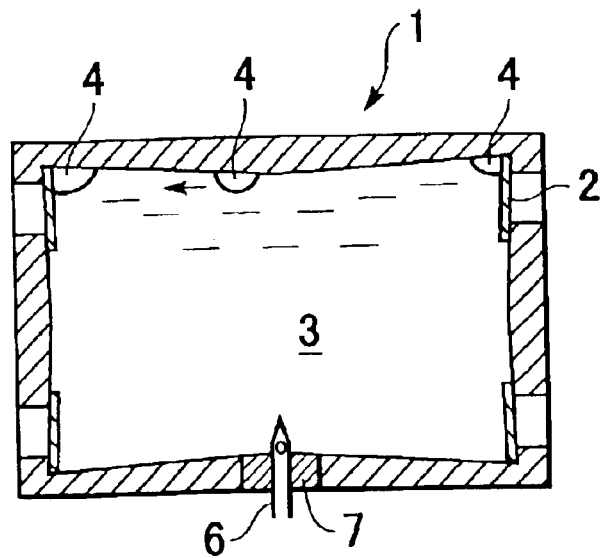
FIG. 3 is a cross-sectional view illustrating an example of the form of wall members of the ink tank shown in FIG. 1.

FIG. 3 is a cross-sectional drawing illustrating the shape of the wall members of the ink tank shown in FIG. 1.

The inner face of each wall member of the ink tank 1 is formed with an inclination of a predetermined angle as to the outer face of the wall member which it faces. Due to this sort of inner face shape, in the event that the ink tank 1 is placed so that the outer face is horizontal (which is almost always the case when the ink tank 1 is mounted to the recording apparatus main unit), the inner face of the wall member forming the ceiling portion is always inclined as to the horizontal direction. Accordingly, any air 4 within the ink tank 1 will move upwards following the inclined ceiling face due to its own buoyancy, and come into contact with an air/fluid separating member 2 disposed at each corner portion of the ink tank 1. In this way, providing air/fluid separating members 2 to each corner portion of the ink tank 1, and further providing inclination to the inner face of the ink tank 1 so that the air 4 can readily move to the corner portions, further ensures contact between the air 4 and the air/fluid separating members 2. Thus, problems wherein ink 3 cannot be readily extracted from the ink tank 1 due to the ink 3 coming into contact with the entire are of the air/fluid separating members 2 can be prevented, and also, even in the event that there is expansion of the air 4 due to change in the ambient temperature or change in air pressure, there is no pressure of the ink 3 placed on the air/fluid separating members 2, so leakage of ink 3 from the air/fluid separating members 2 can be done away with.

Figure 4:
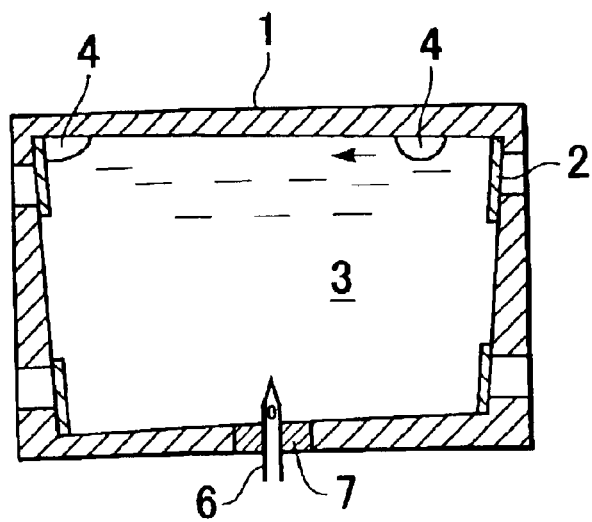
FIG. 4 is a cross-sectional view illustrating another example of the form of wall members of the ink tank shown in FIG. 1.

Note that while FIG. 3 is an arrangement wherein the inclination is provided from the approximate center of the inner face of each wall member toward the corner portions, an arrangement may be used such as shown in FIG. 4 wherein the inner faces of each wall member continuously incline from one corner portion to another adjacent corner portion with regard to the outer face of the wall member facing it. Also, while the arrangements shown in FIGS. 3 and 4 illustrate one cross-section of the ink tank 1, the above advantages can be obtained regardless of which outer face becomes horizontal in the way that the ink tank 1 is placed, by forming the ink tank 1 such that the inner faces have such inclinations at all cross-sections of all wall members.

Now, the above-mentioned predetermined angle is preferably within the range of 1° to 5°. This angle range for the inclination of the inner faces of the wall members is sufficient to allow air to move along the inner face, while keeping loss of capacity within the ink tank 1 due to the inclination angle of the inner face of the wall member to a minimum.

Figure 5:
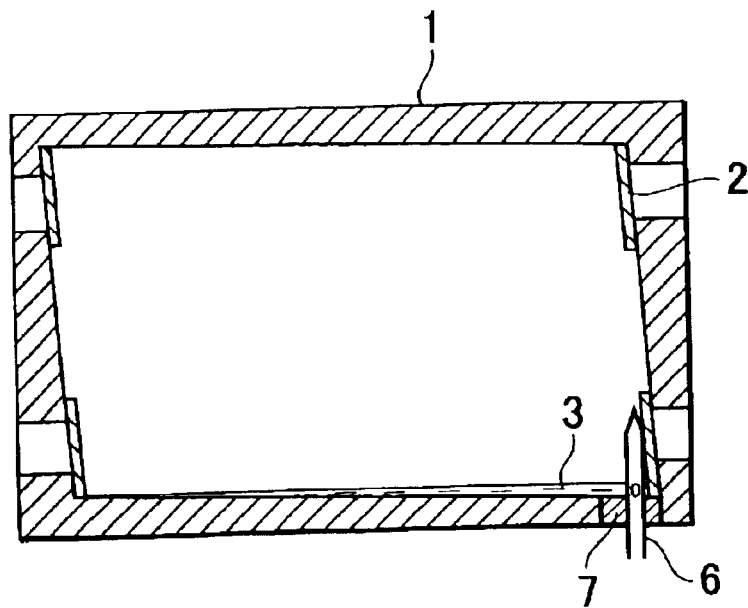
FIG. 5 is a perspective view illustrating another embodiment of the ink tank according to the present invention.

FIG. 5, shows an example of an arrangement wherein, unlike the ink tanks shown in FIGS. 1 and 2, the portion through which the ink needle 6 serving as the ink extracting opening is thrust (i.e., the spout 7) is positioned at a position extremely close to the far edge of the lower face of the ink tank 1 which faces downwards when mounted to the ink-jet recording apparatus.

Figure 6:
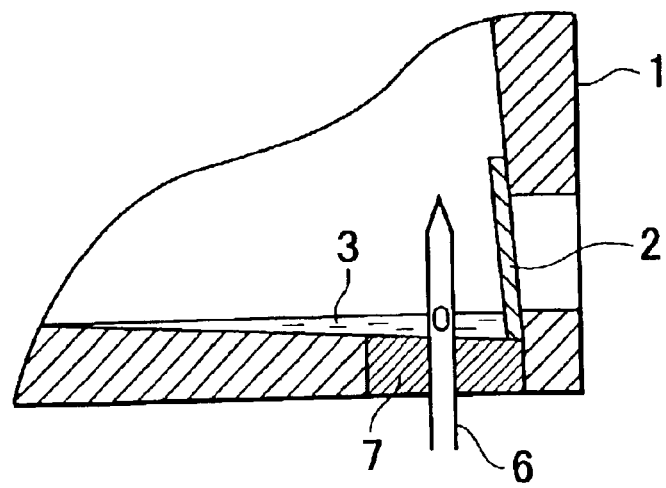
FIG. 6 is an enlarged view of the proximity of an ink needle of the ink tank shown in FIG. 5.

With the ink tank 1 according to the present embodiment, the ink needle 6 is thrust through at a position extremely close to the corner portion of the ink tank 1. Positioning the ink needle 6 thus and configuring the inner face of the ink tank 1 as described above so as to slant down toward the in extracting opening (spout 7) allows the amount of residual ink at the time of using up the ink 3 to be reduced to an extremely small amount. FIG. 6 is an enlarged diagram of the area around the ink needle of the ink thank shown in FIG. 5. The amount of remaining ink can be reduced by placing the hole provided in the ink needle 6 as close to the spout 7 as possible.

Figure 7:
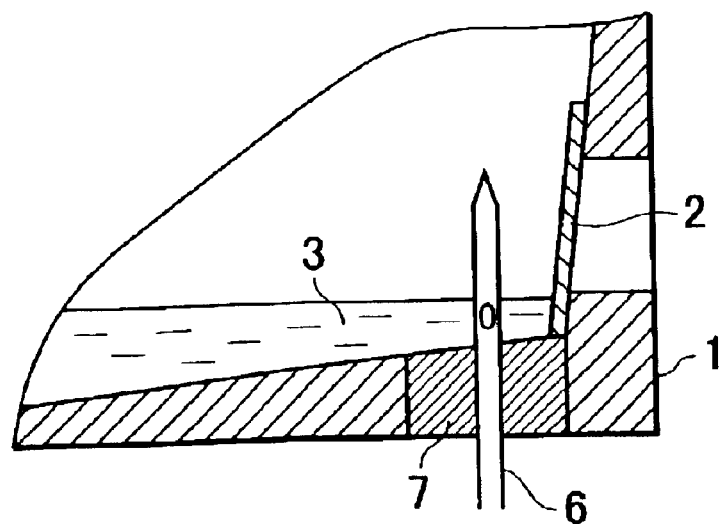
FIG. 7 is a reference diagram illustrating an example of an ink tank wherein the direction of inclination of the inner sides of the wall members differ from that shown in FIG. 5.

On the other hand, forming the inner face of the wall member such that the inclination thereof leads down away from the corner portion where the ink needle 6 is situated toward the corner portion at the opposite side as shown in FIG. 7, ink tends to remain at the corner portion at the opposite side, so more ink is left remaining that the configuration shown in FIG. 6. Accordingly, the amount of ink remaining can be reduced by a configuration wherein the ink extracting opening (spout 7) where the ink needle 6 is thrust through is provided near a corner portion of the ink tank 1, with the inner face of the ink tank 1 inclining down towards the portion where the ink needle 6 is thrust through.

Figure 8:
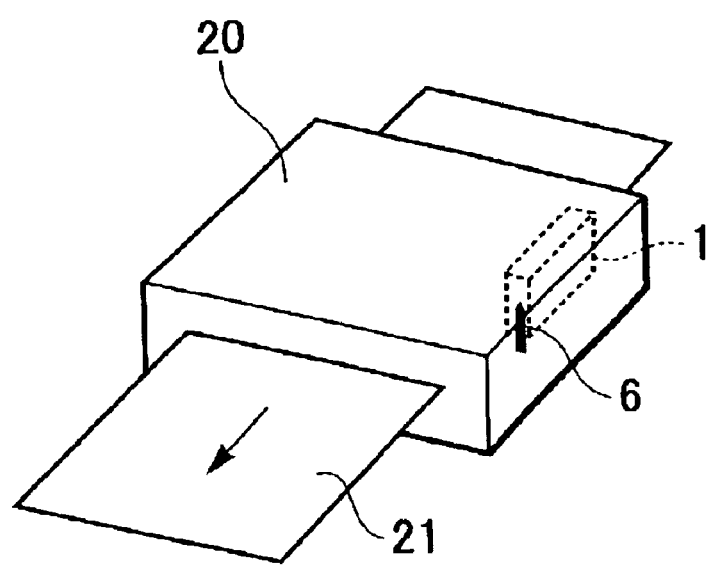
FIG. 8 is a diagram illustrating a horizontal-mounting type ink-jet recording apparatus which uses the ink-tank according to the present invention.

Also, ink-jet recording apparatuses with such an ink tank mounted may be used at an attitude rotated from the normal mounting attitude by 90°. The ink-jet recording apparatus 20 is normally used in a horizontally mounted state as shown in FIG. 8, wherein the wide face of the housing of the ink-jet recording apparatus 20 is positioned downwards. However, in the event that the ink-jet recording apparatus 20 is mounted on the wall and used in this state, the ink-jet recording apparatus 20 is used in a vertical mounted state as shown in FIG. 9, with the wide face of the housing of the ink-jet recording apparatus 20 being positioned parallel to the vertical direction.

Figure 9:
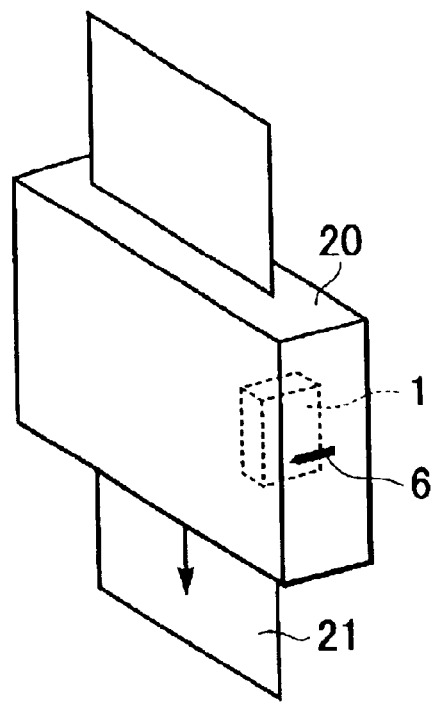
FIG. 9 is a diagram illustrating a vertical-mounting type ink-jet recording apparatus which uses the ink-tank according to the present invention.
Figure 10:
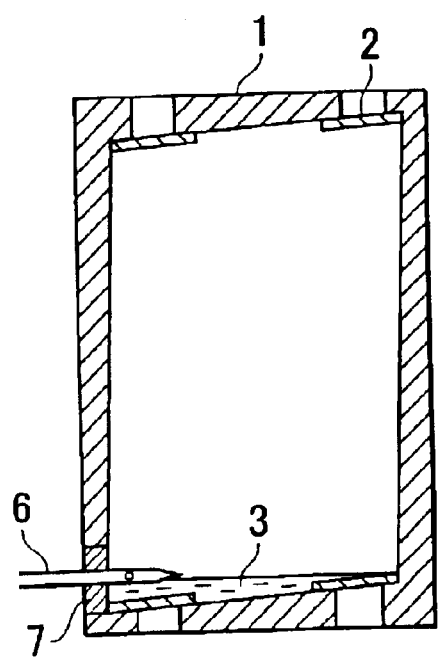
FIG. 10 is a diagram illustrating the attitude of an ink tank in the vertical-mounting type ink-jet recording apparatus shown in FIG. 9.
Figure 11:
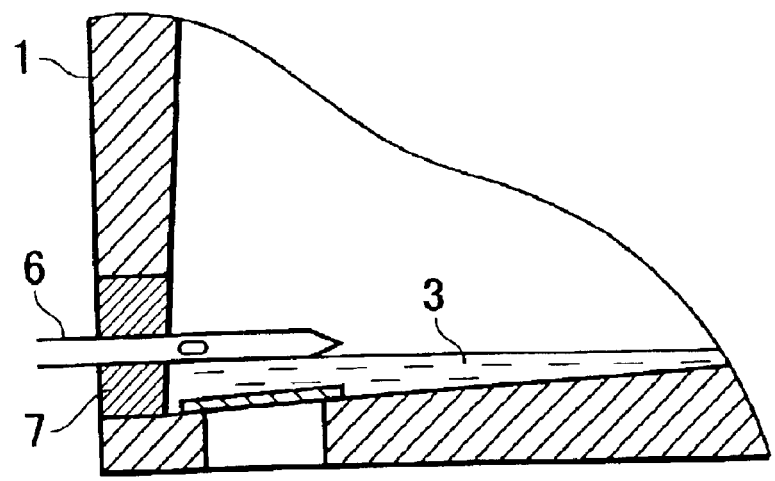
FIG. 11 is an enlarged view of the proximity of an ink needle of the ink tank shown in FIG. 10.
Figure 12:
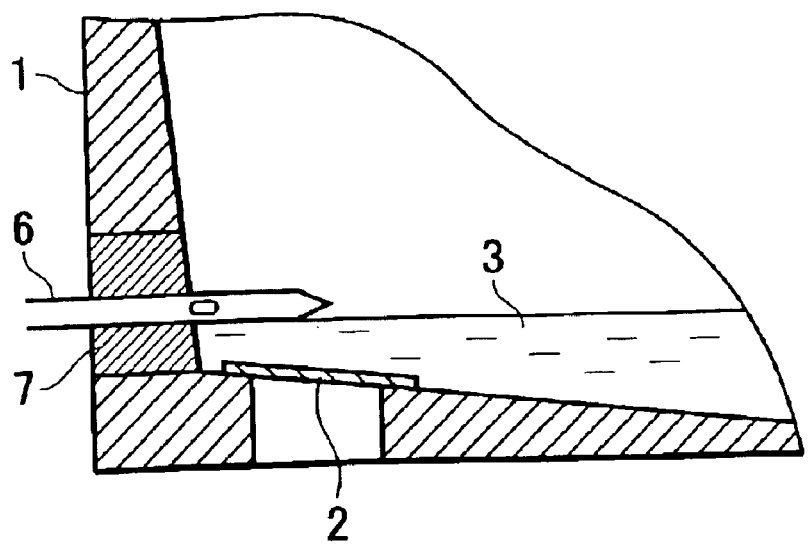
FIG. 12 is a reference diagram illustrating an example of an ink tank wherein the direction of inclination of the inner sides of the wall members differ from that shown in FIG. 11.

In the event of being mounted such as shown in FIG. 9, the ink tank 1 within the recording apparatus 20 assumes the vertically mounted attitude wherein the side face, adjacent to the side of the lower face of the ink tank where the spout 7 is provided, as shown in FIG. 5 and other drawings, becomes the lower face, as shown in FIG. 10. In this case of vertical mounting as well, ink can be efficiently extracted from the ink tank 6 by positioning the spout 7 at a position very close to a corner portion of the ink tank 1, so that the ink needle 6 is situated at the corner portion of the lower face side even when mounted vertically. In this case as well, the amount of ink remaining can be reduced by provided the inner face of the wall member at the lower face side of the ink tank 1 with an inclination leading down toward the spout in the same way. FIG. 11 illustrates this. It is clear that an arrangement such as shown in FIG. 12 wherein the inner face of the wall member at the lower face side of the ink tank 1 has an inclination leading down away from the spout would result in a great amount of ink being left.

In this way, in the event that the ink tank 1 assumes a vertical attitude due to the recording apparatus 20 being mounted vertically, the ink needle 6 is horizontal. In this case, the ink existing below the height of the ink needle 6 such as shown in FIG. 11 cannot be extracted.

In the event of mounting the recording apparatus 20 in a horizontal manner as shown in FIG. 8, the amount of ink remaining can be made extremely little by positioning the hole provided in the ink needle 6 as close as possible to the spout 7. However, in the event of mounting the recording apparatus 20 in a vertical manner as shown in FIG. 9, the ink extracting position cannot be adjusted by the position of the hole of the ink needle, and rather is determined by the position where the ink needle 6 is thrust through the spout 7. The amount of ink can be reduced by bringing this position as close to the lower face of the ink tank 1 as possible, but there has to be a certain gap between the lower face of the ink tank 1 and the ink needle 6, to ensure that the lower face of the ink tank 1 and the ink needle 6 do not interfere. Accordingly, this arrangement allows more ink to remain, as compared with the arrangement shown in FIG. 6.

In order to reduce the amount of ink remaining in the event that the ink needle 6 is positioned horizontally, the length of the lower face of the ink tank 1 is preferably made to be as short as possible. That is to say, in the event that the ink tank is a rectangular parallelepiped, i.e., the cross-section thereof is a rectangle, the longitudinal length of the lower face of the ink tank 1 with the ink needle 6 thrust through horizontally (see FIG. 10) should be shorter than the longitudinal length of the lower face of the ink tank 1 with the ink needle 6 thrust through vertically (see FIG. 5), whereby the amount of ink remaining can be reduced even in the event that the recording apparatus 20 is mounted vertically.

Now, it should be noted that the terms used here such as "vertically mounted" or "horizontally mounted" are only being used to facilitate description of the embodiments, and do not restrict the configuration in any way. Depending on the configuration of the recording apparatus 20, these terms may be switched or other terms used.

Figure 13:
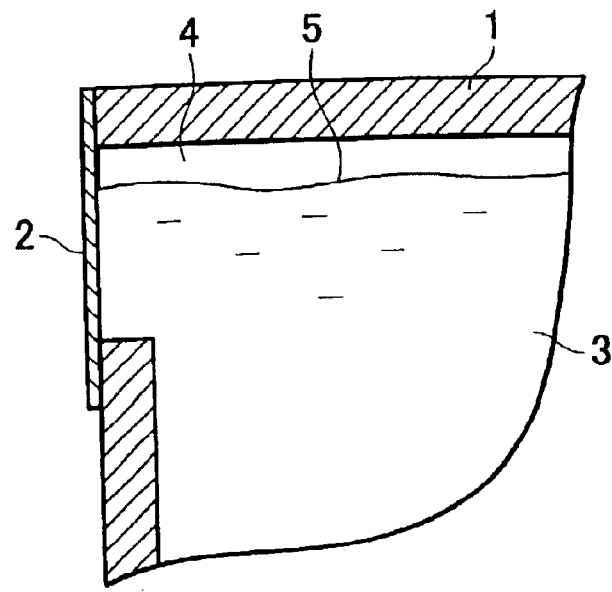
FIG. 13 is a diagram describing the attachment configuration of the air/fluid separating member for the ink tank according to the present invention.
Figure 14:
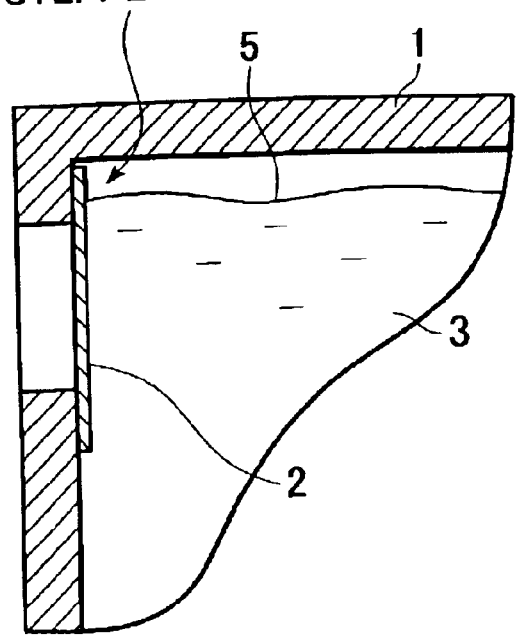
FIG. 14 is a diagram describing the attachment configuration of the air/fluid separating member for the ink tank according to the present invention.

FIGS. 13 and 14 illustrate the structure for attaching the air/fluid separating members to the ink tank according to the present invention.

Means for attaching the air/fluid separating members 2 to the ink tank 1 include heat welding, ultrasonic welding, using adhesive agents, and so forth. However, in the event of attaching the air/fluid separating members to the inner side of the ink tank 1 as shown in FIG. 14, faces must be prepared to which the air/fluid separating members 2 are adhered. This necessitates providing an adhesion face at the farthest edge portion of the wall members of the ink tank 1, leaving a stepped portion with no ventilation there. In the state shown in FIG. 14, the ink surface 5 is on the adhesion face for the air/fluid separating member and the stepped portion of the ink tank 1, such that the ink 3 covers the ventilation area of the air/fluid separating member 2, meaning that ventilation cannot be secured with the air/fluid separating members 2.

To deal with this, attaching the air/fluid separating members 2 to the outer side of the ink tank 1 as shown in FIG. 13 enables the air/fluid separating members 2 to be positioned at the tip portion of the ink tank 1. Thus, the air 4 within the ink tank 1 can be brought into contact with the air/fluid separating members 2 in a sure manner, and difficulties in extracting the ink from the ink tank 1 due to no contact between the air/fluid separating members 2 and the air 4 are prevented, while also preventing leakage of ink 3 from the air/fluid separating members 2 due to the air 4 within the ink tank 1 expanding due to rise in ambient temperature or change in air pressure.

Figure 15:
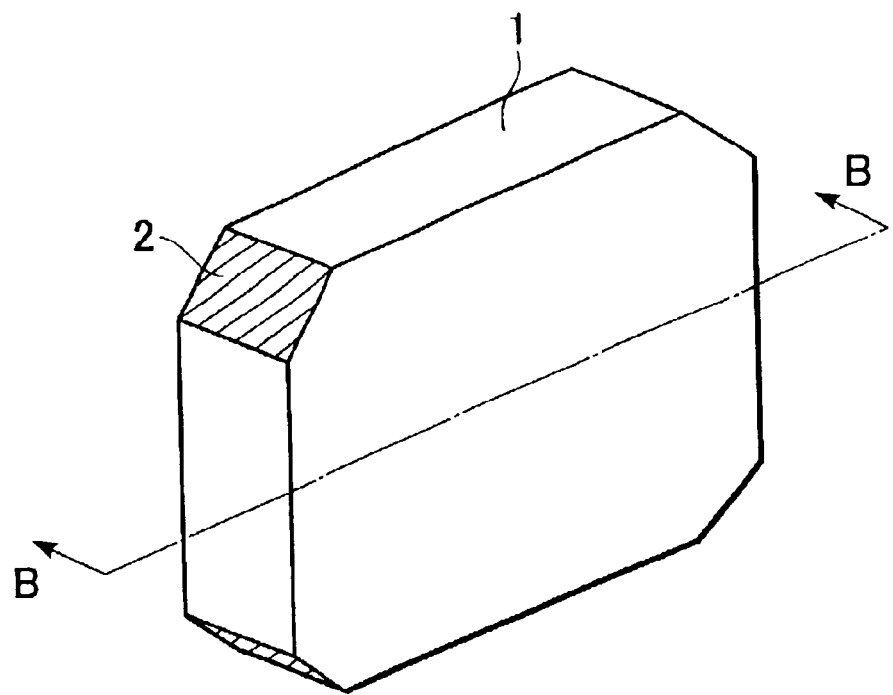
FIG. 15 is a perspective view illustrating another embodiment of the ink tank according to the present invention.
Figure 16:
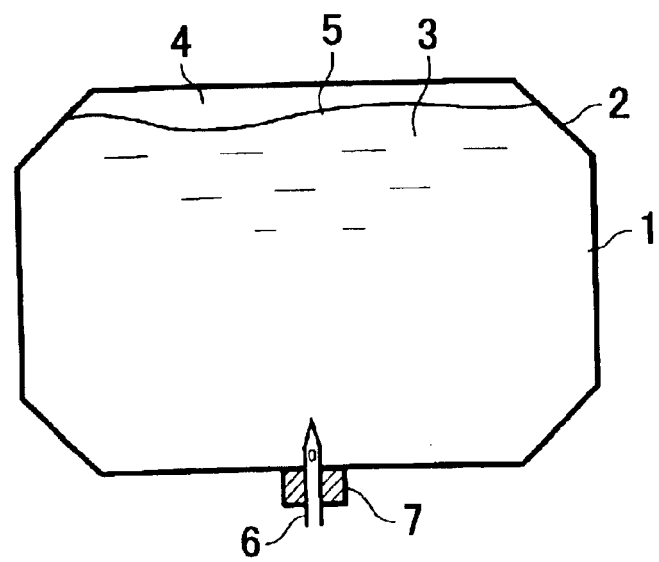
FIG. 16 is a schematic cross-sectional diagram of the ink tank along line B—B in FIG. 15.

FIG. 15 is a perspective view illustrating another embodiment of the ink tank according to the present invention, and FIG. 16 is a schematic cross-sectional view of the ink tank shown in FIG. 15 along line B—B.

The ink tank 1 shown in FIGS. 15 and 16 is a rectangular parallelepiped but has a relatively flattened shape, with the air/fluid separating members 2 provided on four chamfered portions which are the four shortest edges of the rectangular parallelepiped. This ink tank 1 has the air/fluid separating members 2 provided on only four portions, but yields the same advantages as the configuration of the ink tank shown in FIG. 1 with the air/fluid separating members 2 provided at eight positions. Accordingly, the area of the air/fluid separating members 2 used is reduced, and the process for attachment is also simplified, so the cost of the ink tank 1 can be reduced.

Also, providing the air/fluid separating members 2 in an inclined manner by chamfering the corners as with the ink tank 1 shown in FIG. 1 or FIG. 15 yields the following advantages.

There are various types of ink to be stored in the ink tank 1, with components which inhibit the water-repellent capabilities of the air/fluid separating members 2 in order to achieve a wide range of objects, such as improving the permeability of the ink on the recording medium upon which images are formed. For example, in the event that a surface-active agent is contained in the ink, the ink more readily adheres to the air/fluid separating member as compared with arrangements otherwise. Particularly, in the event that the air/fluid separating members 2 are provided to the ceiling portion of the ink tank, there have been cases wherein ink remains adhered to the entire surface of the air/fluid separating member.

Figure 17:
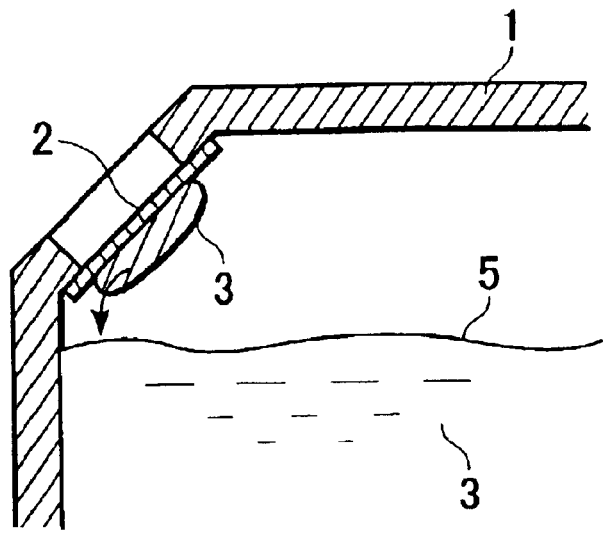
FIG. 17 is a diagram illustrating the manner in which ink slides down off the surface of the air/fluid separating member attached to the inner side of a corner portion of the ink tank according to the present invention.

Now, with an arrangement wherein the air/fluid separating members 2 are attached to the ink tank 1 at any angle other than an angle wherein the plane portion of an air/fluid separating member 2 would be parallel or orthogonal to at least two faces of the ink tank 1 with a generally rectangular parallelepiped shape meeting one another, the plane portions of the air/fluid separating members are at an angle with the horizontal direction, regardless which of the faces of the rectangular parallelepiped are placed downward. Accordingly, ink 3 adhering to the air/fluid separating members 2 flows downwards by gravity following the inclined face formed by the inclined plane portion of the air/fluid separating members 2 as shown in FIG. 17, so no ink 3 remains on the surface of the air/fluid separating members 2. Accordingly, the air 4 within the ink tank 1 can be brought into contact with the air/fluid separating members 2 in a sure manner, and difficulties in extracting the ink from the ink tank 1 due to no contact between the air/fluid separating members 2 and the air 4 are prevented, while also preventing leakage of ink 3 from the air/fluid separating members 2 due to the air 4 within the ink tank 1 expanding due to rise in ambient temperature or change in air pressure.

Figure 18:
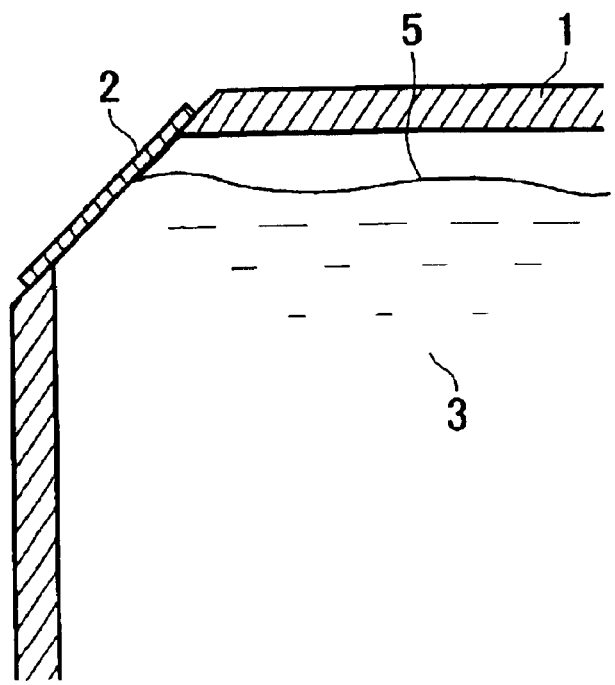
FIG. 18 is a diagram illustrating an example of the air/fluid separating member attached to the outer side of a corner portion of the ink tank.
Figure 19:
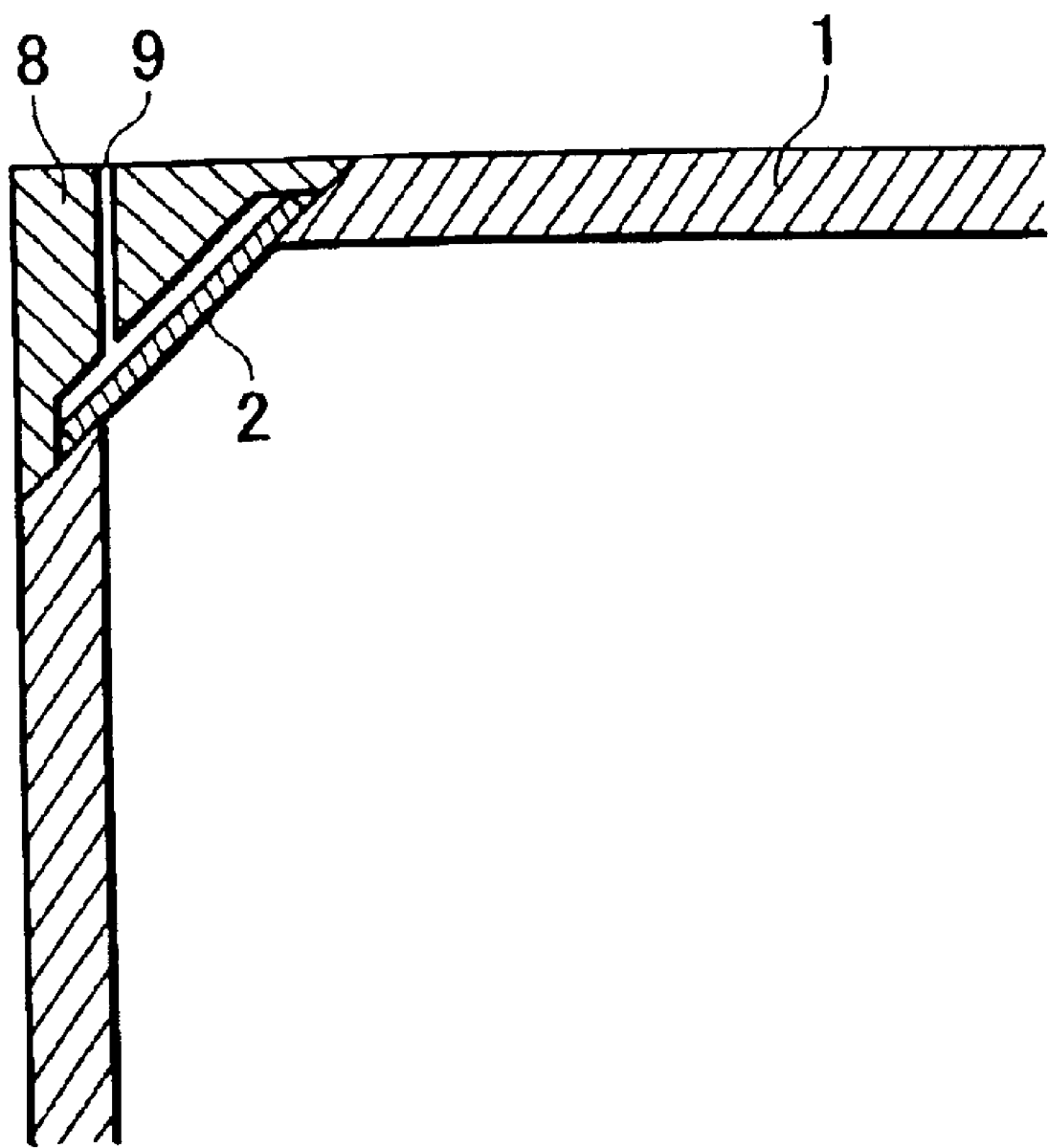
FIG. 19 is a diagram illustrating an example of attaching the air/fluid separating member to the outer side of a corner portion of the ink tank, and further covering the air/fluid separating member with a cover having an atmosphere communicating hole.

Also, chamfering the corner portions of the ink tank 1 also allows the air/fluid separating members 2 to be attached from the outside of the ink tank 1 as shown in FIG. 18, thereby yielding the same advantages as those described above. Further, as shown in FIG. 19, an arrangement for covering each of the air/fluid separating members 2 with covers 8 each having an atmosphere communicating hole 9 allows the relatively fragile air/fluid separating members 2 to be protected, while preventing evaporation of ink 3 from the air/fluid separating members 2. Evaporation of the ink 3 from the air/fluid separating members 2 only occurs from the atmosphere communicating holes 9 in the covers 8, and the cross-sectional area of the atmosphere communicating holes 9 is smaller than the area of the air pores of the air/fluid separating members 2, so evaporation of ink 3 from the air/fluid separating members 2 can be kept at an extremely low level.

Also, the above-described configuration wherein air/fluid separating members are disposed inclined to at least two faces of the rectangular parallelepiped shaped ink tank can also be applied to waste ink tanks for storing waste ink generated at the time of performing maintenance of the ink-jet recording head, in addition to application to ink tanks for storing ink to be supplied to the ink-jet recording apparatus.

Figure 20:
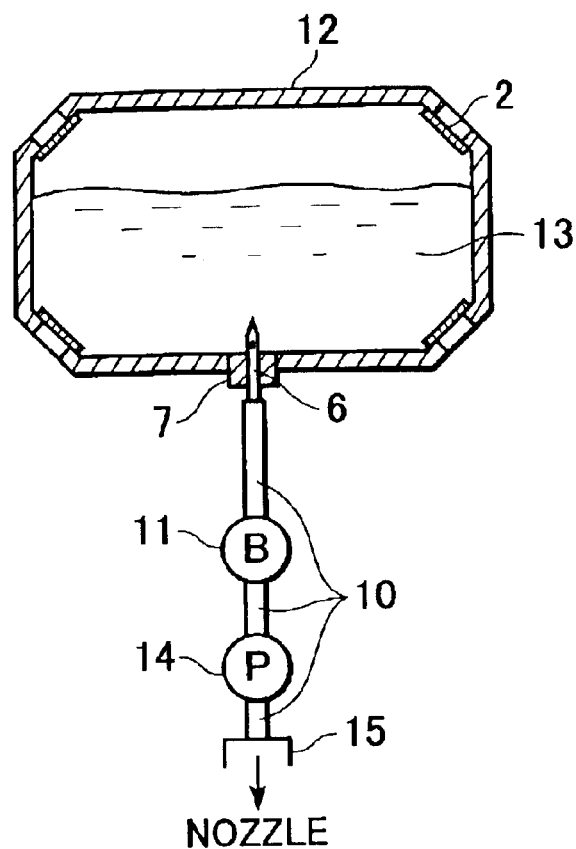
FIG. 20 is a diagram illustrating a schematic configuration of an ink-jet recording apparatus containing a waste ink tank to which the air/fluid separating member is applied.

FIG. 20 is a diagram illustrating a schematic configuration of an ink-jet recording apparatus comprising a waste ink tank to which air/fluid separating members configured as with the above embodiment have been applied.

A waste ink tank 12 has a generally rectangular parallelepiped shape, with the air/fluid separating members 2 being provided near each of the corners. The ink needle 6 is thrust through the spout 7, and waste ink sent from a nozzle (not shown) of the recording head is introduced into the waste ink tank 12 through the ink needle 6. A waste ink channel 10 is connected to the ink needle 6, with a pump 14 provided upstream thereof (i.e., toward the recording head side). This pump 14 suctions ink out from the nozzle of the recording head, and at the same time shunts the suctioned in to the waste ink tank 12 as waste ink 13. Various types of pumps may be used for the pump 14, such as piston pumps, tube pumps, diaphragm pumps and so forth.

Further, a check valve 11 is provided downstream from the upon 14 (i.e., toward the waste ink tank side) of the waste ink channel 10, and this check valve 11 prevents the waste ink 13 guided to the waste ink tank 12 by the pump 14 from flowing back towards the pump 14. In the event that no check valve 11 is provided, the waste ink 13 guided to the ink tank 12 flows back towards the pump 14 due to head or the like, leading to waste ink leaking out in the recording apparatus main unit. Thus, the check valve 11 is necessary for preventing back-flow of waste ink.

Also, the pump 14 communicates with a cap 15 for protecting the nozzles of the recording head further upstream via the waste ink channel 10. With an arrangement wherein the cap 15 and the inside of the waste ink channel 10 are sealed off, in the event that the air within the cap 15 and waste ink channel 10 expands due to change in temperature or change in pressure while the recording apparatus is not operating, the air could enter the nozzles, thus preventing discharge of ink form the nozzles. The check valve 11 allows air and waste ink to freely flow in the direction from the cap 15 towards the waste ink tank 12, while preventing waste ink from flowing in the direction from the waste ink tank 12 towards the cap 15. Various types of check valves can be used for the check valve 11, or, check valves built into the pump 14 may be used as well.

Figure 21:
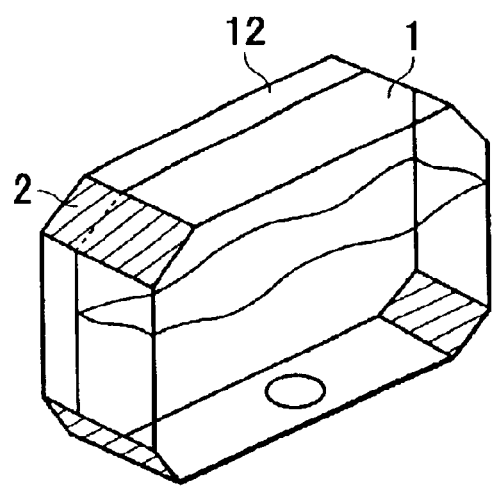
FIG. 21 is a perspective diagram illustrating an example of applying the air/fluid separating member to an integrated waste ink tank and ink tank.

FIG. 21 illustrates an example wherein a waste ink tank and an ink tank are integrated. Integrating the waste ink tank 12 and the ink tank 1 as shown in FIG. 21 enables the ink tank 1 and the waste ink tank 12 to be replaced at the same time, thereby doing away with the trouble of replacing the waste ink tank 12 separately. Also, an integrated waste ink tank 12 and ink tank 1 allows the number of air/fluid separating members used at the corner portions of the waste ink tank and the ink tank to be cut in half, facilitating reduction in the number of parts and simplifying manufacturing processes, which leads to reduction in costs.

Also, an arrangement may be made wherein, of the integrally-formed waste ink tank and ink tank, the waste ink tank 12 is formed of a non-transparent material and the ink tank 1 is formed of a transparent material, thus allowing the user to visually confirm the type or the like of the ink to be used at that time, while preventing the user from seeing the waste ink which the user needs not be conscious of.

Note that the various arrangements made with regard to the ink tank 1 as described above may be made with the waste ink tank 12 shown in FIGS. 20 and 21, as well. It is also needless to say that the above advantages can be obtained for arrangements wherein the ink tank 1 and/or waste ink tank 12 are integrated with an ink-jet recording head (not shown).

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink tank for storing ink to be supplied to an ink-jet recording apparatus, said ink tank comprising:
   an ink tank body, formed in a generally rectangular parallelepiped shape; and
   air/fluid separating members having air pores, disposed in at least the proximity of each corner of said generally rectangular parallelepiped;
   wherein the inner face of each wall member forming each external face of said generally rectangular parallelepiped is formed so as to be inclined at a predetermined angle as to the outer face of another wall member facing said inner face.

2. An ink tank according to claim 1, wherein said predetermined angle is within the range of 1° to 5°.

3. An ink tank according to claim 1, further comprising an attaching face for attaching said air/fluid separating members, on the outer side of said ink tank.

4. An ink tank according to claim 1, wherein said air/fluid separating members are attached in the proximity of said corner portions at any angle other than an angle wherein the plane portion of said air/fluid separating member would be parallel or orthogonal to at least two faces of said generally rectangular parallelepiped meeting one another.

5. An ink tank according to claim 1, further comprising chamfered portions at each corner portion of said generally rectangular parallelepiped, wherein said air/fluid separating members are attached to said chamfered portions.

6. An ink tank according to claim 1, further comprising chamfered portions on the four edge lines connecting the four corners of two faces of said generally rectangular parallelepiped which face one another, wherein said air/fluid separating members are attached to said chamfered portions.

7. An ink tank according to claim 1, further comprising covers for covering each of said air/fluid separating members, with an atmosphere communicating hole having a cross-sectional area smaller than the area of air pores of said air/fluid separating members being formed in said covers.

8. An ink tank according to claim 1, further comprising an ink extracting opening near the longitudinally bottommost portion of the lower face of said ink tank which faces downwards in the state of said ink tank being attached to said ink-jet recording apparatus;
   and wherein the inner face of the wall member forming said lower face of said generally rectangular parallelepiped is formed so as to be inclined as to said lower face at a predetermined angle such that said inner face slopes down toward the side to which said ink extracting opening is provided, in the state that said ink tank is attached to said ink-jet recording apparatus.

9. An ink tank according to claim 8, wherein the inner face of the wall member of said generally rectangular parallelepiped forming the outer face adjacent to the side of said lower face at which said ink extracting opening is provided is formed having an inclination of a predetermined angle as to said outer face, so that said inner face slopes down toward said ink extracting opening, in the state that said outer face is faced downwards.

10. An ink tank according to claim 8, wherein said predetermined angle is within the range of 1° to 5°.

11. An ink tank according to claim 9, wherein said predetermined angle is within the range of 1° to 5°.

12. An ink tank according to claim 8, wherein said ink extracting opening is configured such that an ink needle for extracting ink out from said ink tank perpendicularly penetrates said lower face, and wherein said generally rectangular parallelepiped has the length in the longitudinal direction of the outer face adjacent to the side of said lower face wherein said ink extracting opening is provided formed so as to be shorter than the longitudinal length of said lower face.

* * * * *